July 10, 1956   I. EDELMAN   2,754,401
MOUNTING HOUSING FOR ROTISSERIE CONTROL MECHANISM
Filed Sept. 1, 1953   4 Sheets-Sheet 3

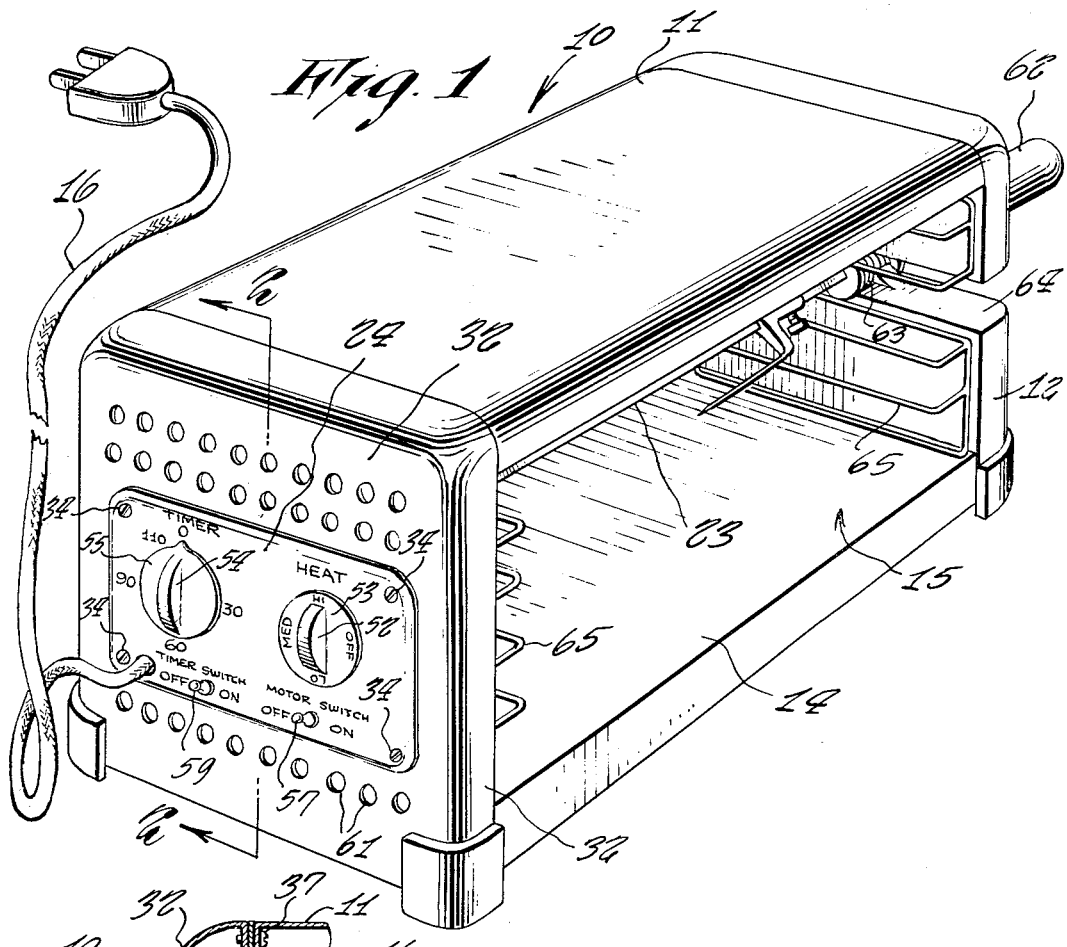

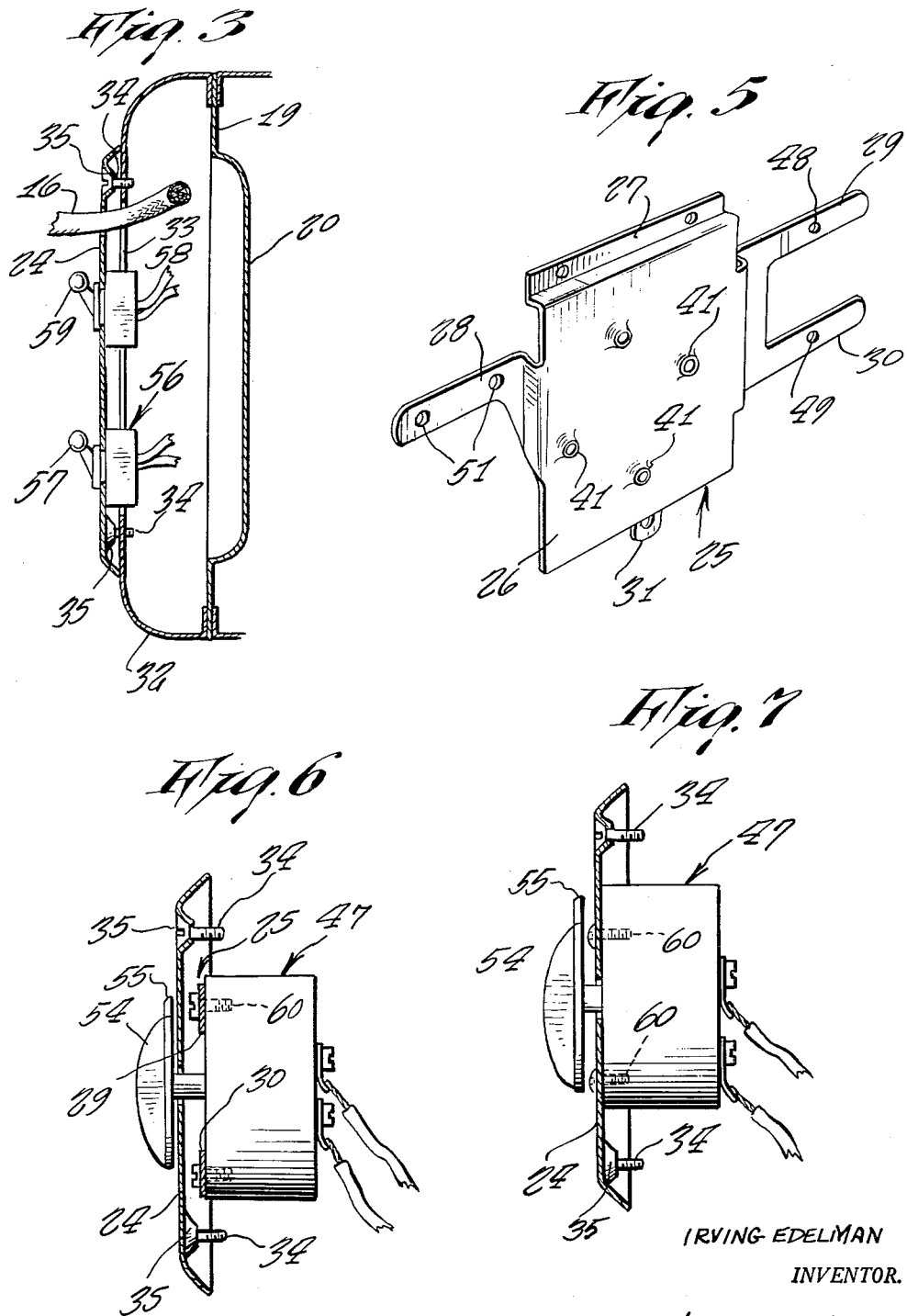

IRVING EDELMAN
INVENTOR.

BY
ATTORNEY

July 10, 1956  I. EDELMAN  2,754,401
MOUNTING HOUSING FOR ROTISSERIE CONTROL MECHANISM
Filed Sept. 1, 1953 4 Sheets-Sheet 4

IRVING EDELMAN
INVENTOR.

BY
ATTORNEY

United States Patent Office 2,754,401
Patented July 10, 1956

2,754,401

MOUNTING HOUSING FOR ROTISSERIE CONTROL MECHANISM

Irving Edelman, Brooklyn, N. Y.

Application September 1, 1953, Serial No. 377,940

3 Claims. (Cl. 219—35)

This invention relates generally to a roaster and more particularly to an electric roaster wherein there is provided a housing for the control mechanism, said housing having a covering plate to the inside wall of which the control mechanism parts are secured.

The main object of the invention resides in the provision of an electric roaster which is readily accessible for purposes of repair and wherein the control mechanism is very easily substituted without penetrating the inside of the device.

A further object of the invention resides in the provision of an electric roaster which is sturdy and durable in construction, reliable and efficient in operation, and inexpensive to manufacture and assemble.

Another object resides in the provision of an electric roaster wherein an end wall provided with a recess portion is suitably secured to the frame work and against which a removable plate is applied at the recess portion for forming a housing for the mechanism secured to the inner wall of said cover plate.

For other objects and a better understanding of the invention, reference will be had to the following detailed description taken in connection with the accompanying drawing, in which:

Fig. 1 is a perspective view of the device of the instant invention in assembled relation;

Fig. 2 is an enlarged fragmentary sectional view taken along the line 2—2 of Fig. 1;

Fig. 3 is a transverse sectional view taken along the line 3—3 of Fig. 2;

Fig. 5 is a view in perspective showing a bracket member adapted to be secured to the inner wall of the cover plate for retaining the control mechanism parts in proper and spaced relationship;

Fig. 6 is a vertical sectional view taken along the line 6—6 of Fig. 4 and

Fig. 7 is a vertical sectional view similar to Fig. 6 but showing a modified form of construction.

Figure 4:
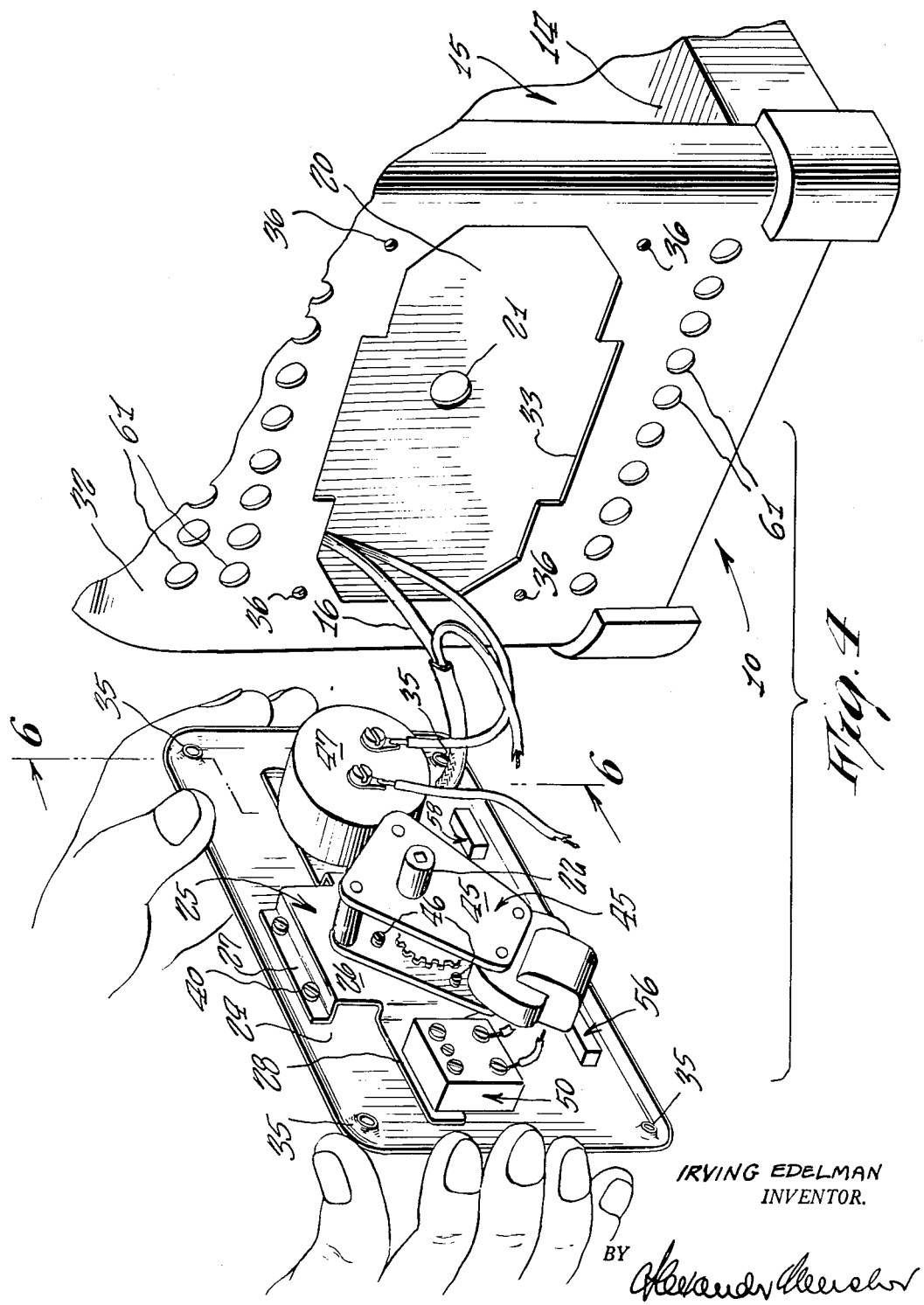
Fig. 4 is an enlarged view in perspective showing the cover plate for the control mechanism housing in removed position and indicating the control mechanism secured to the inner wall of the cover plate.
Figure 8:
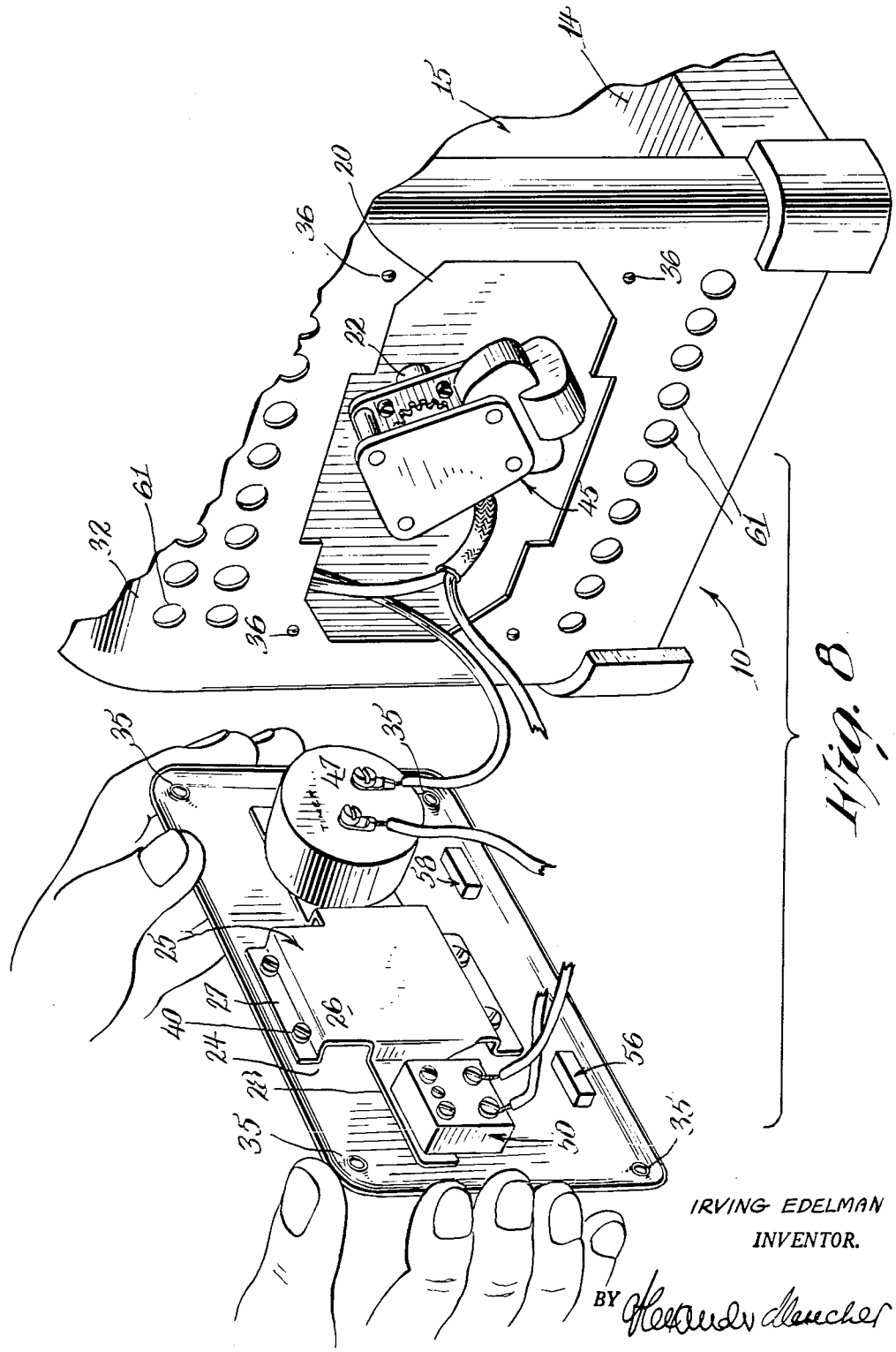
Fig. 8 is an enlarged view in perspective modified from Figs. 1–4 and showing the motor gear mechanism secured to the recess of the side wall of the housing instead of on the cover plate.

Referring now to the drawings in detail, more particularly to Fig. 1 there is generally indicated at 10 the roaster casing or housing of generally rectangular figuration and including a top wall 11, an end wall 12 and an opposite end wall 32.

The device also includes a rear wall (not indicated) and a bottom wall 14. The housing 10 is provided with an open front indicated generally by 15.

Depending from the top wall 11 of the casing 10 is the usual insulating plate which contains the conventional high resistance wires for heating the interior of the device, the said plate and heating elements not being shown. Current is supplied through an insulated electrical cord 16 which extends through a suitable aperture 17 in an end plate 19 which forms the inner wall of the control mechanism housing.

The end wall 19 is provided with a rectangularly shaped recess 20 having a central opening 21 through which a socket 22 is adapted to pass for the purpose of receiving a spit 23, as will hereinafter be described.

A plate 24, which serves as a covering for the mechanism housing, is provided on the inner wall thereof with an attaching bracket, generally indicated by numeral 25 (Fig. 5) the bracket 25 being provided with a main body member 26, a longitudinal top attachment bracket 27, an end attachment bracket in the form of an extending longitudinal ledge 28, a U-shaped end attachment bracket provided with legs 29 and 30 and a bottom single leg attachment bracket 31.

The false end wall 32 is suitably secured to the inner end wall 19, as by the screws 37 and 38 (Fig. 2) the said false end wall 32 having an aperture 33 over which the cover plate 24 is applied by means of corner screws 34 penetrating countersunk openings 35 in cover plate 24 and internally threaded openings 36 aligned therewith in false end wall 32.

The attaching bracket 25 is secured to the inner wall of the cover member 24 along the top bracket 27 and bottom bracket 31 by means of screws 40 (Fig. 4) screw threaded into plate 24.

The attaching bracket 25 at main plate 26 is provided with inwardly extending sockets 41 to which a conventional electric motor-gear mechanism 45 is secured by screws 46, the drive shaft of the motor-gear mechanism carrying the socket 22 previously referred to.

A conventional timer mechanism 47 is secured to the legs 29 and 30 by means of the openings 48 and 49 provided in the latter and screws 60, this timer mechanism being connected in series with the heating elements, not shown.

A conventional rheostat mechanism 50 is secured to the attaching bracket 28 by means of the openings 51 and screws, not shown, the rheostat mechanism 50 being also connected in series with the heating elements disposed below the top wall 11.

The rheostat or heat control mechanism 50 includes an external knob 52 integrally formed with an indicating dial 53, the knob 52 and dial 53 being disposed on the outer face of the cover plate 24 (Fig. 1).

The timer mechanism 47 includes an external knob 54 integrally formed with a dial-pointer 55 which cooperates with suitable minute markings carried on the cover plate 24 (Fig. 1).

The motor-gear mechanism 45 is connected in parallel with the heating elements to a suitable source of power through the electrical cord 16, a switch 56 being connected in series with the motor-gear mechanism 45 and including an external button 57 mounted on the outer face of the cover plate 24. The switch 56 itself is suitably secured to the inner face of the cover plate 24, as shown in Fig. 4.

A second switch 58 is connected in series with the timer mechanism 47 and includes a button 59 mounted in the outer face of the cover plate 24, the switch 58 itself being suitably secured to the inner face of cover plate 24.

The false end wall 32 is provided with a plurality of perforations 61 to permit air cooling of the control mechanism disposed on the inner face of the cover plate 24.

In operation, the button 57 will be flipped to the "On" position to start the motor-gear mechanism 45 and to rotate thereby the spit 23 containing the food to be roasted. The button 59 will then be flipped to the "On" position and the timer mechanism 47 set at the appropriate position, thereby supplying current to the high resistance wires below the top wall 11 for the necessary time period. The rheostat mechanism 50 will then be set at the appropriate position, to control the amperage flowing through the high resistance heating wires and thereby the heat radiation.

The spit 23 is provided with the usual handle 62 and the intermediate portion 63 which fits into the spit slot 64 provided in the end wall 12. Wire tray supports 65 are also provided.

By merely removing the screws 34 from the threaded openings 36 in the false end wall 32, the cover plate 24 may be conveniently removed carrying with it the control mechanism. Thus, the entire mechanism may be very easily substituted without penetrating the inside of the device.

It should be apparent that the inner end wall 19 and more particularly the recessed portion 20 thereof cooperates with the false outer wall 32 and the cover plate 24 to provide a housing for the control mechanism, the cover plate carrying the control mechanism on the inside wall thereof and providing ready access for purposes of repair.

Referring now particularly to Fig. 7, there is shown a modified form of construction wherein the timer mechanism 47 as well as the gear-motor mechanism 45 and the rheostat mechanism 50 are connected directly to the inside of the cover plate 24, eliminating thereby the attaching bracket 25.

In other respects the form of the invention shown in Fig. 7 is the same as that shown in Figs. 1 through 6, and like reference numerals identify like parts throughout the several views.

The form of the invention shown in Figure 4 is similar to that of Figs. 1 through 6 except that the motor-gear mechanism 45 instead of being applied to bracket 25 is affixed to the inner plate of recess 20 with socket 22 penetrating opening 21.

While various changes may be made in the detail construction, it shall be understood that such changes shall be within the spirit and scope of the present invention, as defined by the appended claims.

What is claimed is:

1. In an electric roaster including a meat-receiving casing and electric heating elements disposed below the top wall of the casing, a permanent inner end wall having a central recessed portion, a false outer end wall connected to and freely spaced from said permanent inner end wall, said false outer wall having an opening aligned with said central recessed portion, a cover plate removably mounted across the outer face of said false outer wall and closing said opening, a motor-gear mechanism mounted on the inside of said cover plate at the central portion thereof, said gear-motor mechanism including a spit-receiving socket carried on the drive shaft of the motor, said central recessed portion of said inner end wall having an opening receiving said socket therethrough, a timer mechanism connected in series with the heating elements and secured across the inner face of said cover plate alongside said gear motor mechanism, said timer mechanism including a manually operable dial mounted on the outside of said cover plate, and a rheostat mechanism mounted on the inside of said cover plate alongside said gear motor mechanism and connected in series with said heating elements, said rheostat mechanism including a manually operable dial on the outside of said cover plate.

2. In an electric roaster including a meat receiving casing and electrical heating elements disposed below the top wall of the casing, a permanent inner end wall secured to the framework of the roaster, a false outer wall connected to and freely spaced from said inner end wall providing a hollow housing therebetween, said inner end wall having a central recessed portion, said outer end wall having an opening aligned with said recessed portion, a cover plate releasably secured across the outside of said outer end wall and closing said opening, a gear motor mechanism mounted on the inside of said cover plate at the center thereof and including a spit-receiving socket, said central recessed portion having a central opening removably receiving said socket, a timer mechanism connected in series with the heating elements and mounted on the inside of said cover plate alongside said gear motor mechanism, said timer mechanism including an external knob on the outside of said cover plate, a rheostat mounted on the inside of said cover plate alongside said gear motor mechanism and connected in series with the electric heating elements, said rheostat including an external knob on the outside of said cover plate, a first switch connected in series with said gear motor mechanism and mounted on the inside of said cover plate, said first switch including an external button mounted on the outside of said cover plate, and a second switch connected in series with said timer mechanism and mounted on the inside of said cover plate, said second switch including an external button on the outside of said cover plate.

3. In an electric roaster, including a meat receiving housing and electric heating elements disposed below the top wall of the housing, a permanent inner end wall having a central recessed portion, an outer end wall connected to and freely spaced from said inner end wall providing a housing therebetween, said outer end wall having an opening aligned with said recessed portion, a cover plate releasably mounted across the outside of said outer end wall and closing said opening, an attachment bracket having a main central body portion, stepped flanges along the upper and lower edges of said body portion whereby to connect said attachment bracket to the inside of said cover plate with said main body portion freely spaced therefrom, a gear motor mechanism mounted on said main body portion, said gear motor mechanism including a spit receiving socket, said recessed central portion having an opening receiving said socket therethrough, an end attachment bracket at one side of said main body portion, a timer mechanism mounted on said end attachment bracket and connected in series with the heating elements, said timer mechanism including an external knob on the outer face of said outer end wall, a second end attachment bracket on the other side of said body portion, and a rheostat mechanism mounted on said second end attachment bracket, said rheostat mechanism being connected in series with the electric heating elements.

References Cited in the file of this patent

UNITED STATES PATENTS

| | | |
|---|---|---|
| 1,329,762 | Mignon | Feb. 3, 1920 |
| 2,245,220 | Nelson | June 10, 1941 |
| 2,523,796 | Weeks | Sept. 26, 1950 |
| 2,618,730 | Panken | Nov. 18, 1952 |